US012533368B2

(12) United States Patent
Bergonzelli Degonda et al.

(10) Patent No.: US 12,533,368 B2
(45) Date of Patent: Jan. 27, 2026

(54) COMPOSITIONS FOR USE IN THE REDUCTION OF PAIN AND/OR PERCEPTION OF PAIN IN INFANTS AND YOUNG CHILDREN

(71) Applicant: SOCIETE DES PRODUITS NESTLE S.A., Vevey (CH)

(72) Inventors: Gabriela Bergonzelli Degonda, Bussigny (CH); Laurent Favre, Carrouge (CH); Laurent Ferrier, Epalinges (CH); Clara Lucia Garcia-Rodenas, Forel (CH)

(73) Assignee: Societe des Produits Nestle S.A., Vevey (CH)

( * ) Notice: Subject to any disclaimer, the term of this patent is extended or adjusted under 35 U.S.C. 154(b) by 848 days.

(21) Appl. No.: 17/756,832

(22) PCT Filed: Dec. 4, 2020

(86) PCT No.: PCT/EP2020/084620
§ 371 (c)(1),
(2) Date: Jun. 3, 2022

(87) PCT Pub. No.: WO2021/110911
PCT Pub. Date: Jun. 10, 2021

(65) Prior Publication Data
US 2022/0409645 A1    Dec. 29, 2022

(30) Foreign Application Priority Data
Dec. 6, 2019   (EP) .................................... 19214072

(51) Int. Cl.
*A61K 31/702*   (2006.01)
*A61K 35/741*   (2015.01)
*A61P 29/00*    (2006.01)

(52) U.S. Cl.
CPC .......... *A61K 31/702* (2013.01); *A61K 35/741* (2013.01); *A61P 29/00* (2018.01)

(58) Field of Classification Search
None
See application file for complete search history.

(56) References Cited

U.S. PATENT DOCUMENTS

| 2016/0243138 A1* | 8/2016 | Hennet | A61K 31/7004 |
| 2016/0243139 A1 | 8/2016 | Vigsnaes et al. | |
| 2016/0296541 A1* | 10/2016 | Sangild | A61K 35/747 |
| 2016/0296542 A1 | 10/2016 | Sangild | |
| 2018/0036323 A1 | 2/2018 | Sprenger et al. | |
| 2018/0042949 A1 | 2/2018 | Sprenger et al. | |
| 2018/0078572 A1 | 3/2018 | Sprenger et al. | |
| 2018/0110253 A1 | 4/2018 | Sprenger et al. | |
| 2018/0368460 A1 | 12/2018 | Mcconnell et al. | |

FOREIGN PATENT DOCUMENTS

| CN | 105682664 A | 6/2016 | |
| EP | 3212197 A1 | 9/2017 | |
| WO | 9956754 A1 | 11/1999 | |
| WO | WO-2017103019 A1 * | 6/2017 | ........... A23L 33/135 |
| WO | 2018206434 | 11/2018 | |
| WO | 2018215961 | 11/2018 | |
| WO | 2019121929 | 6/2019 | |

OTHER PUBLICATIONS

Chinese Office Action for Appl No. 202080079889.0 dated Jul. 26, 2023.
Vanhoutvin et al., "The Effects of Butyrate Enemas on Visceral Perception in Healthy Volunteers", Neurogastroenterology and Motility, vol. 21, 2009, pp. 952-e76, XP93160596.
Fukumoto et al., "Short-Chain Fatty Acids Stimulate Colonic Transit via Intraluminal 5-HT Release in Rats", American Journal of Physiology. Regulatory, Integrative and Comparative Physiology, vol. 284, Issue No. 5, 2003, pp. R1269-R1276, XP93160594.
European Office Action for Appl No. 20 817 350.0-1105 dated May 16, 2024, 7 pages.
Jantscher-Krenn et al. "Human milk oligosaccharides and their potential benefits for the breast-fed neonate" Minerva Pediatrica, 2012, vol. 64, No. 1, pp. 83-99.
Holscher et al. "Human Milk Oligosaccharides Influence Maturation of Human Intestinal Caco-2Bbe and HT-29 Cell Lines" The Journal of Nutrition, 2014, vol. 144, pp. 586-591.

(Continued)

*Primary Examiner* — Dale R Miller
(74) *Attorney, Agent, or Firm* — K&L Gates LLP

(57) ABSTRACT

The present invention relates to compositions comprising a mix of human milk oligosaccharides consisting of 2'-fucosyllactose and difucosyllactose, for use in the reduction of pain and/or perception of pain in an infant or in a young child. The compositions are particularly effective in the restoration of the sensitivity of the bi-directional pain transmission pathways in the gut-brain axis to normal levels. The compositions are in particular useful in reducing abdominal pain, such as pain associated with gastrointestinal discomfort, functional gastrointestinal disorders, and/or gastrointestinal diseases and consequently also contribute to reducing the crying periods and to improving the quality of sleep, the general quality of life, the mood, the playfulness, the temperament and/or the happiness of the infants and young children.

19 Claims, 4 Drawing Sheets

(56) References Cited

OTHER PUBLICATIONS

Van Den Abbeele et al. "2'-Fucosyllactose alters the composition and activity of gut microbiota from formula-fed infants receiving complementary feeding in a validated intestinal model" Journal of Functional Foods, 2019, vol. 61, 8 pages.
Kunz et al. "Oligosaccharides in Human Milk: Structural, Functional, and Metabolic Aspects" Annu. Rev. Nutr., 2000, vol. 20, pp. 699-722.
Bienenstock et al., "Fucosylated but not Sialylated Milk Oligosaccharides Diminish Colon Motor Contractions", Plos One, vol. 8, Issue No. 10, Oct. 2013, p. 1-9, XP093224466.
European Office Action for Appl No. 20 817 350.0-1105 dated Nov. 21, 2024, 7 pages.
India Office Action for Appl No. 202217021529 dated Jan. 22, 2025, 7 pages.

* cited by examiner

COMPOSITIONS FOR USE IN THE REDUCTION OF PAIN AND/OR PERCEPTION OF PAIN IN INFANTS AND YOUNG CHILDREN

CROSS REFERENCE TO RELATED APPLICATIONS

The present application is a National Stage of International Application No. PCT/EP2020/084620, filed on Dec. 4, 2020, which claims priority to European Patent Application No. 19214072.1, filed on Dec. 6, 2019, the entire contents of which are being incorporated herein by reference.

FIELD OF THE INVENTION

The present invention relates to compositions comprising a mix of human milk oligosaccharides consisting of 2-fucosyllactose and difucosyllactose, for use in the reduction of pain and/or perception of pain in an infant or in a young child. The compositions are particularly effective in the restoration of the sensitivity of the bi-directional pain transmission pathways in the gut-brain axis to normal levels. The compositions are in particular useful in reducing abdominal pain, such as pain associated with gastrointestinal discomfort, functional gastrointestinal disorders, and/or gastrointestinal diseases and consequently also contribute to reducing the crying periods and to improving the quality of sleep, the general quality of life, the mood, the playfulness, the temperament and/or the happiness of the infants and young children.

BACKGROUND OF THE INVENTION

Infants, including newborn babies experience pain in the same way as adults, as revealed for example in Goksan et al.; *fMRI reveals neural activity overlap between adult and infant pain*; eLife 2015; 4:e06356. Other studies even suggest that infants could perceive pain more acutely than adults and older children.

Infants and young children can experience diverse types of pain, which could for example be caused by inflammation that may become chronic. In infants and young children, like in adults, pain is associated with reactions such as increased heart rate, altered heart rate variability, faster and shallower respirations leading to lower oxygen saturation, and higher arterial pressure. Such reactions caused by prolonged or repeated exposure to pain have been found to have a negative impact on the development of infants and young children and may lead for example to abnormal development of the pain system such as hyperalgesia or to impaired regulation of stress-related hormones, such as increased production of cortisol. See for example Ziraldo, Breanne, "Infant Pain Management" (2010); *Senior Honors Theses;* 198, which can be obtained from Liberty University, Virginia, USA and is available at the date of filing under http://digitalcommons.liberty.edu/honors/198.

Infants and young children are particularly exposed to specific sources of pain, such as abdominal pain. Causes of abdominal pain include abdominal discomfort, functional gastrointestinal disorders and gastrointestinal disease.

One example of a common cause of discomfort is for example colic (Benninga et al Childhood Functional Gastrointestinal Disorders: Neonate/Toddler Gastroenterology 150 (2016):1443-55). The cause of colic is not completely understood but it seems related to gut hypersensitivity to pain, so that gut distension caused by the normal passage of gas or faeces leads to pain in colicky infants, causing extensive crying periods, poor sleep and reduced quality of life, impaired mood, playfulness, temperament and happiness for the infant or young child, in turn having a negative impact on the quality of life of the parents. Abdominal pain may also result from other causes of discomfort such as impaired stool patterns, exposure to new food, bloating and cramps and functional gastrointestinal disorders.

Functional gastrointestinal disorders are non-destructive disorders of the gastrointestinal tract and include functional dyspepsia, functional constipation, functional diarrhea, irritable bowel syndrome (IBS), abdominal migraine, recurrent abdominal pain (RAP) and functional abdominal pain-not otherwise specified (FAP-NOS). A further detailed definition of functional abdominal pain disorders is provided in Hyams et al.; Childhood Functional Gastrointestinal Disorders: Child/Adolescent; Gastroenterology 150 (2016):1456-1468.

Gastrointestinal diseases also occur, such as inflammatory bowel disease (IBD), infectious diarrhea and necrotizing enterocolitis (NEC). Inflammatory bowel disease (IBD) is a serious chronic and destructive disorder of the gastrointestinal tract. It includes Crohn disease (CD) and ulcerative colitis (UC).

It is therefore desirable to reduce pain and/or perception of pain in infants and young children. However, side effects associated with pain management medicines may be even more problematic in infants and young children than in adults. It would therefore be of particular interest to identify means of reducing nociception in infants and young children that are non-pharmacological and associated with low risk for the infant or young child. It would also be particularly advantageous to identify ingredients specially adapted to human infants and/or young children and capable of reducing pain and/or perception of pain.

Mother's milk is recommended for all infants. However, in some cases breast feeding is inadequate or unsuccessful for medical reasons or the mother chooses not to breast feed. Infant formulae have been developed for these situations. Fortifiers have also been developed to enrich mother's milk or infant formula with specific ingredients. In such cases, it would be even more preferred to provide means to reduce nociception and thus to reduce the incidence of pain in infants and young children through nutritional intervention.

The effect of nutritional ingredients, such as human milk oligosaccharides on pain has already been investigated in the prior art. US2016/0243139 discloses the use of synthetic compositions containing one or more human milk mono- or oligosaccharides for treating visceral pain. According to the teaching of this document, a large variety of human milk mono- and oligosaccharides can be used, the preferred ones being 2'-FL, 3'FL, DFL, LNnT, 3'-SL, 6'-SL or LNFP-1 and the most preferred ones being a mix of 2'-FL and LNnT or LNT.

WO2016/139329 relates to compositions for use in improving stool consistency or frequency in infants or young children, such effects being associated with prevention and/or treatment of colic and/or gut discomfort. For this benefit, a nutritional composition comprising at least one fucosylated oligosaccharide and at least one N-acetylated oligosaccharide is used. The fucosylated oligosaccharide and the N-acetylated oligosaccharide may be selected within a broad list. Most preferred fucosylated oligosaccharide is 2-FL and most preferred N-acetylated oligosaccharide is LNnT.

It would be useful to further optimize the effect of nutritional compositions on reduction of nociception in all infants and young children or at least to provide alternative composition effective on reduction of nociception in infants and young children.

Some specific populations of infants and young children are particularly in need of compositions able to reduce abdominal pain and/or perception of pain. Such infants and young children are for example preterm infants, low birth weight infant, and/or growth-retarded infants or young children. Indeed such infants are often experiencing adverse medical conditions and require significantly more frequent medical intervention than term infants and infants having experienced normal development. Many of such medical interventions are unfortunately painful for the infant or young child, which is thus faced with repeated and sometimes acute pain. For such infants it is particularly advantageous to complement pharmacological pain management with nutritional compositions capable of reducing nociception.

There is clearly a need for developing suitable methods to reduce pain and/or perception of pain, and in particular abdominal pain and/or visceral sensitivity in infants and young children.

There is also a need to deliver such health benefits in a manner that is particularly suitable for the young subjects (infants and young children), in a manner that does not involve a classical pharmaceutical intervention, as these infants or young children are particularly fragile.

There is a need to deliver such health benefits in these infants or young children in a manner that does not induce side effects and/or in a manner that is easy to deliver, and well accepted by the parents or health care practitioners.

There is also a need to deliver such benefits in a manner that does keep the cost of such delivery reasonable and affordable by most.

There is thus clearly a need to develop alternative methods than the classical pharmaceutical intervention such as the use of pharmaceutical analgesics, at least because of the associated risk of side effects.

SUMMARY OF THE INVENTION

The present inventors have found that a composition comprising a mix of human milk oligosaccharides consisting of 2-fucosyllactose and difucosyllactose can advantageously be used to reduce pain and/or perception of pain in an infant or a young child, and in particular abdominal pain and/or visceral sensitivity. The present inventors have found that this specific mix of human milk oligosaccharides is particularly effective in reducing the pain and/or perception of pain, particularly of abdominal pain and/or visceral sensitivity in infants and young children. A mix of human milk oligosaccharides consisting of 2'-fucosyllactose and difucosyllactose is more efficient than mixes of other oligosaccharides (such as for example mixes of sialylated oligosaccharides). It has even been surprisingly found that a mix of oligosaccharides consisting of 2'-fucosyllactose and difucosyllactose is more efficient than a mix of these two oligosaccharides together with additional human milk oligosaccharides, such as N-acetylated oligosaccharides, sialylated oligosaccharides and/or other fucosylated oligosaccharides, as demonstrated by the examples.

Accordingly, the present invention therefore provides a nutritional composition comprising a mix of human milk oligosaccharides consisting of 2'-fucosyllactose (2'-FL) and difucosyllactose (DiFL) for use in a method of reducing pain and/or perception of pain in an infant or a young child. In a preferred embodiment, the nutritional composition is for use in the restoration of the sensitivity of the bi-directional pain transmission pathways in the gut-brain axis to normal levels.

The present invention also provides a growing-up milk comprising a mix of human milk oligosaccharides consisting of 2'-FL and DiFL for use in a method of reducing pain and/or perception of pain in a child. In a preferred embodiment, the growing-up milk is for use in the restoration of the sensitivity of the bi-directional pain transmission pathways in the gut-brain axis to normal levels.

The nutritional composition of the present invention is in particular advantageous for use in a method of
 reducing visceral sensitivity
 reducing abdominal pain;
 reducing pain associated with gastrointestinal discomfort, functional gastrointestinal disorders and/or gastrointestinal diseases;
 reducing crying periods;
 improving the quality of sleep; and/or
 improving the quality of life
in an infant or a young child.

The invention also relates to the use of a composition comprising a mix of human milk oligosaccharides consisting of 2'-FL and DiFL in a method of
 reducing visceral sensitivity
 reducing abdominal pain;
 reducing pain associated with gastrointestinal discomfort, functional gastrointestinal disorders and/or gastrointestinal diseases;
 reducing crying periods;
 improving the quality of sleep; and/or
 improving the quality of life
in an infant or a young child.

The invention also relates to the use of a composition comprising a mix of human milk oligosaccharides consisting of 2'-FL and DiFL in a method of
 improving mood,
 improving playfulness,
 improving temperament, and/or
 improving happiness
in an infant or a young child.

DETAILED DESCRIPTION OF THE INVENTION

Figure 1:
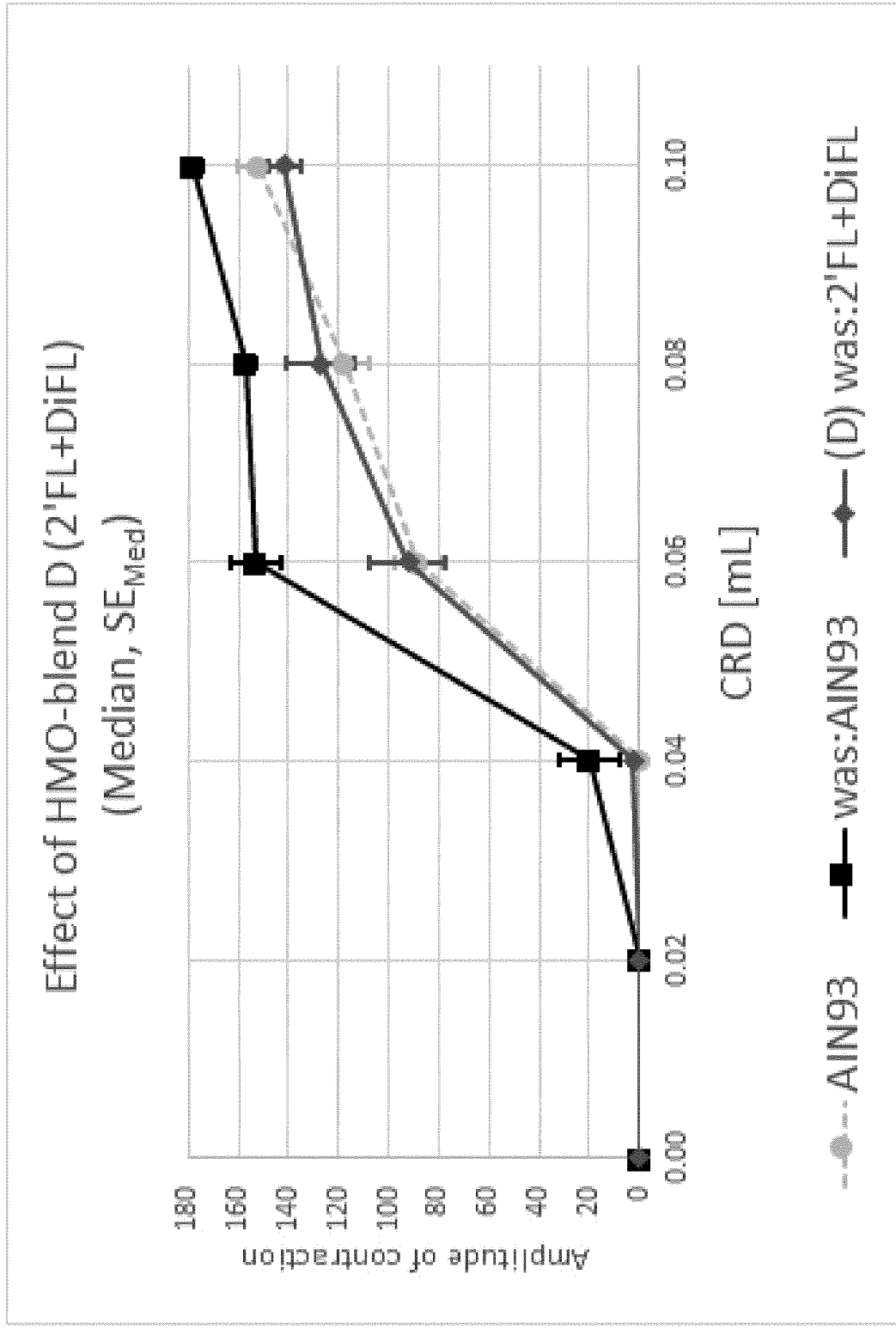
FIG. 1: amplitude of contraction measured as a function of colorectal dilatation in non-sensitized mice (AIN93; dots), in sensitized mice (was:AIN93; squares) and in sensitized mice to which 2'-FL and DiFL have been administered (was:2'FL+DiFL; diamonds).

As used herein, the following terms have the following meanings.

The term "infant" means a child under the age of 12 months. The expression "young child" means a child aged between one and less than three years, also called toddler. The expression "child" means a between three and seven years of age.

An "infant or young child born by C-section" means an infant or young child who was delivered by caesarean. It means that the infant or young child was not vaginally delivered.

An "infant or young child vaginally born" means an infant or young child who was vaginally delivered and not delivered by caesarean.

A "preterm" or "premature" means an infant or young child who was not born at term. Generally it refers to an infant or young child born prior 37 weeks of gestation.

An "infant having a low birth weight" means a new born having a body weight below 2500 g (5.5 pounds) either because of preterm birth or restricted fetal growth. It therefore encompasses:
  infant or young child who has/had a body weight from 1500 to 2500 g at birth (usually called "low birth weight" or LBW)
  infant or young child who has/had a body weight from 1000 to 1500 g at birth (called "very low birth weight" or VLBW)
  infant or young child who has/had a body weight under 1000 g at birth (called "extremely low birth weight" or ELBW).

An "infant born small for gestational age (SGA)" means a baby with birth weights below the $10^{th}$ percentile for babies of the same gestational age.

The expression "nutritional composition" means a composition which nourishes a subject. This nutritional composition is usually to be taken orally or intravenously, and it usually includes a lipid or fat source and a protein source.

In a particular embodiment the composition of the present invention is a hypoallergenic nutritional composition. The expression "hypoallergenic nutritional composition" means a nutritional composition which is unlikely to cause allergic reactions.

In a particular embodiment the composition of the present invention is a "synthetic nutritional composition". The expression "synthetic nutritional composition" means a mixture obtained by chemical and/or biological means, which can be chemically identical to the mixture naturally occurring in mammalian milks (i.e. the synthetic composition is not breast milk).

The expression "infant formula" as used herein refers to a foodstuff intended for particular nutritional use by infants during the first months of life and satisfying by itself the nutritional requirements of this category of person (Article 2(c) of the European Commission Directive 91/321/EEC 2006/141/EC of 22 Dec. 2006 on infant formulae and follow-on formulae). It also refers to a nutritional composition intended for infants and as defined in Codex Alimentarius (Codex STAN 72-1981) and Infant Specialties (incl. Food for Special Medical Purpose). The expression "infant formula" encompasses both "starter infant formula" and "follow-up formula" or "follow-on formula".

A "follow-up formula" or "follow-on formula" is given from the 6th month onwards. It constitutes the principal liquid element in the progressively diversified diet of this category of person.

The expression "baby food" means a foodstuff intended for particular nutritional use by infants or young children during the first years of life.

The expression "infant cereal composition" means a foodstuff intended for particular nutritional use by infants or young children during the first years of life.

The expression "growing-up milk" (or GUM) refers to a milk-based drink generally with added vitamins and minerals, that is intended for young children or children.

By the term "fortifier", it is meant any composition used to fortify or supplement either human breast milk, infant formula, growing-up milk or human breast milk fortified with other nutrients. Accordingly, the fortifier can be administered after dissolution in human breast milk, in infant formula, in growing-up milk or in human breast milk fortified with other nutrients or otherwise it can be administered as a stand-alone composition. When administered as a stand-alone composition, the fortifier can be also identified as being a "supplement". In one embodiment, the fortifier is a supplement.

The expression "weaning period" means the period during which the mother's milk is substituted by other food in the diet of an infant or young child.

The expressions "days/weeks/months/years of life" and "days/weeks/months/years of birth" can be used interchangeably.

The expression "reducing nociception" encompasses one or several of the following:
  reducing visceral sensitivity
  reducing abdominal pain;
  reducing pain associated with gastrointestinal discomfort, functional gastrointestinal disorders and/or gastrointestinal diseases
  reducing crying periods;
  improving the quality of sleep; and
  improving the quality of life.

The expression "reducing visceral sensitivity" refers to the reduction of the perception of pain and/or discomfort in the gastrointestinal tract.

The expression "reducing abdominal pain" refers to the reduction of the intensity of abdominal pain. Reduction of the "visceral sensitivity" refers to reduction of the perception of pain in the gastrointestinal tract in a subject and results in a reduction of the intensity of the abdominal pain in a subject, irrespective of the cause generating pain. Abdominal pain can be caused by several factors. One particular example is pain associated with gastrointestinal discomfort, functional gastrointestinal disorders and/or gastrointestinal disease.

The "mother's milk" should be understood as the breast milk or the colostrum of the mother.

An "oligosaccharide" is a saccharide polymer containing a small number (typically three to ten) of simple sugars (monosaccharides).

The term "HMO" or "HMOs" refers to human milk oligosaccharide(s). These carbohydrates are highly resistant to enzymatic hydrolysis, indicating that they may display essential functions not directly related to their caloric value. It has especially been illustrated that they play a vital role in the early development of infants and young children, such as the maturation of the immune system. Many different kinds of HMOs are found in the human milk. Each individual oligosaccharide is based on a combination of glucose, galactose, sialic acid (N-acetylneuraminic acid), fucose and/or N-acetylglucosamine with many and varied linkages between them, thus accounting for the enormous number of different oligosaccharides in human milk—over 130 such structures have been identified so far. Almost all of them have a lactose moiety at their reducing end while sialic acid and/or fucose (when present) occupy terminal positions at the non-reducing ends. The HMOs can be acidic (e.g. charged sialic acid containing oligosaccharide) or neutral (e.g. fucosylated oligosaccharide).

A "composition comprising a mix of human milk oligosaccharides consisting of 2'-FL and DiFL" refers to a composition comprising 2'-FL and DiFL as only human milk oligosaccharides (as defined above). In particular the composition is devoid of N-acetylated oligosaccharides, sialylated oligosaccharides, fucosylated oligosaccharides other than 2'-FL and DiFL and precursors of HMOs such as sialic acid or fucose. The composition is also free of human milk oligosaccharide precursors.

A "fucosylated oligosaccharide" is an oligosaccharide having a fucose residue. It has a neutral nature. Some examples are 2-FL (2'-fucosyllactose), 3-FL (3-fucosyllactose), difucosyllactose (DiFL), Lacto-difucotetraose (LDFT)), lacto-N-fucopentaose (e.g. lacto-N-fucopentaose I, lacto-N-fucopentaose II, lacto-N-fucopentaose III, lacto-N-fucopentaose V), lacto-N-fucohexaose, lacto-N-difucohexaose I, fucosyllacto-N-hexaose, fucosyllacto-N-neohexaose, difucosyllacto-N-hexaose I, difucosyllacto-N-neohexaose II and any combination thereof. Without wishing to be bound by theory it is believed that the fucosyl-epitope of the fucosylated oligosaccharides may act as decoy at the mucosal surface. By a competition effect, it may prevent and/or limit the action of the pathogens responsible of infections (of viral or bacterial origin) or of their secreted components (e.g. toxins), especially by avoiding their binding to natural ligands, and without to be bound by theory, this is believed to therefore reduce the risk of infections/inflammations, and particularly the risk of LRT/ear infections and/or inflammations. In addition, the fucosylated oligosaccharides are thought to boost growth and metabolic activity of specific commensal microbes reducing inflammatory response and creating an environment unfavourable for pathogens thus leading to colonization resistance.

The expressions "fucosylated oligosaccharides comprising a 2'-fucosyl-epitope" and "2-fucosylated oligosaccharides" encompass fucosylated oligosaccharides with a certain homology of form since they contain a 2'-fucosyl-epitope, therefore a certain homology of function can be expected. Without wishing to be bound by theory the 2'-fucosyl-epitope of these fucosylated oligosaccharides is believed to be particularly specific to pathogens (or their secreted components) involved in the LRT and/or ear infections.

The expression "N-acetylated oligosaccharide(s)" encompasses both "N-acetyl-lactosamine" and "oligosaccharide(s) containing N-acetyl-lactosamine". They are neutral oligosaccharides having an N-acetyl-lactosamine residue. Suitable examples are LNT (lacto-N-tetraose), para-lacto-N-neohexaose (para-LNnH), LNnT (lacto-N-neotetraose) and any combinations thereof. Other examples are lacto-N-hexaose, lacto-N-neohexaose, para-lacto-N-hexaose, para-lacto-N-neohexaose, lacto-N-octaose, lacto-N-neooctaose, iso-lacto-N-octaose, para-lacto-N-octaose and lacto-N-decaose.

A "precursor of HMO" is a key compound that intervenes in the manufacture of HMO, such as sialic acid and/or fucose.

A "sialylated oligosaccharide" is a charged sialic acid containing oligosaccharide, i.e. an oligosaccharide having a sialic acid residue. It has an acidic nature. Some examples are 3-SL (3' sialyllactose) and 6'SL (6' sialyllactose).

The nutritional composition of the present invention can be in solid form (e.g. powder) or in liquid form. The amount of the various ingredients (e.g. the oligosaccharides) can be expressed in g/100 g of composition on a dry weight basis when it is in a solid form, e.g. a powder, or as a concentration in g/L of the composition when it refers to a liquid form (this latter also encompasses liquid composition that may be obtained from a powder after reconstitution in a liquid such as milk, water . . . , e.g. a reconstituted infant formula or a follow-on/follow-up formula or an infant cereal product or any other formulation designed for infant nutrition).

The term "prebiotic" means non-digestible carbohydrates that beneficially affect the host by selectively stimulating the growth and/or the activity of healthy bacteria such as bifidobacteria in the colon of humans (Gibson G R, Roberfroid M B. *Dietary modulation of the human colonic microbiota: introducing the concept of prebiotics. J Nutr.* 1995; 125:1401-12).

The term "probiotic" means microbial cell preparations or components of microbial cells with a beneficial effect on the health or well-being of the host. (Salminen S, Ouwehand A. Benno Y. et al. "Probiotics: how should they be defined" Trends Food Sci. Technol. 1999:10 107-10). The microbial cells are generally bacteria or yeasts.

The term "cfu" should be understood as colony-forming unit.

All percentages are by weight unless otherwise stated.

In addition, in the context of the invention, the terms "comprising" or "comprises" do not exclude other possible elements. The composition of the present invention, including the many embodiments described herein, can comprise, consist of, or consist essentially of the essential elements and limitations of the invention described herein, as well as any additional or optional ingredients, components, or limitations described herein or otherwise depending on the needs.

Any reference to prior art documents in this specification is not to be considered an admission that such prior art is widely known or forms part of the common general knowledge in the field.

The invention will now be described in further details. It is noted that the various aspects, features, examples and embodiments described in the present application may be compatible and/or combined together.

A first object of the present invention is therefore a nutritional composition comprising a mix of human milk oligosaccharides consisting of 2'-FL and DiFL for use in reducing pain and/or pain perception in an infant or a young child. In a preferred embodiment, the nutritional composition is for use in the restoration of the sensitivity of the bi-directional pain transmission pathways in the gut-brain axis to normal levels.

A second object of the present invention is a growing-up milk comprising a mix of human milk oligosaccharides consisting of 2'-FL and DiFL for use in reducing pain and/or perception of pain in a child. In a preferred embodiment, the growing-up milk comprises any of the ingredients described below with respect to the nutritional composition of the invention, in any described amount. In a preferred embodiment, the growing-up milk is for any use that is described herein with respect to the nutritional composition. In a preferred embodiment, the growing-up milk is for use in the restoration of the sensitivity of the bi-directional pain transmission pathways in the gut-brain axis to normal levels.

To achieve such benefits, the nutritional composition of the invention is preferably for use in a method of
    reducing visceral sensitivity in a subject;
    reducing abdominal pain in subject;

reducing pain associated with gastrointestinal discomfort, functional gastrointestinal disorders and/or gastrointestinal diseases, reducing crying periods in a subject, preferably reducing crying periods in a subject experiencing pain, preferably in a subject experiencing abdominal pain, most preferably in a subject experiencing pain associated with gastrointestinal discomfort, functional gastrointestinal disorders and/or gastrointestinal disease such as defined herein;

improving the quality of sleep in a subject, preferably in a subject experiencing pain, more preferably in a subject experiencing abdominal pain, most preferably in a subject experiencing pain associated with gastrointestinal discomfort, functional gastrointestinal disorders and/or gastrointestinal diseases such as defined herein; and improving the quality of life of a subject, preferably of a subject experiencing pain, more preferably of a subject experiencing abdominal pain, most preferably in a subject experiencing pain associated with gastrointestinal discomfort, functional gastrointestinal disorders and/or gastrointestinal diseases such as defined herein.

wherein the subject is an infant or a young child.

In a preferred aspect, gastrointestinal discomfort is caused by colic, bloating and/or cramps. In another preferred aspect, functional gastrointestinal disorder is selected from functional dyspepsia, functional constipation functional diarrhea, irritable bowel syndrome (IBS), abdominal migraine and recurrent abdominal pain (RAP), functional abdominal pain-not otherwise specified (FAP-NOS). In a preferred aspect, the gastrointestinal disease is selected from inflammatory bowel disease (IBD), infectious diarrhea and/or necrotizing enterocolitis (NEC).

For the purpose of the present invention, the reduction of pain is achieved by reducing the perception of pain. The compositions of the present invention have an impact on the mechanism of nociception and are therefore able to reduce the perception of pain irrespective of the origin of such pain. It is therefore effective to reduce for example the perception of pain originating from the performance of a medical or surgical act or from some injury, disease, disorder and/or discomfort. The mechanism of reducing the perception of pain is different from the reduction of pain that can be achieved by treating the injury, disease, disorder or discomfort that is causing the pain. It is therefore intended that the composition of the present invention is not for treating the injury, disease, disorder or discomfort that is causing the pain but only for reducing the way the subject perceives pain and thus relieving the subject from pain.

In a particularly advantageous embodiment of the present invention, 2'-FL and DiFL are present in the nutritional composition in some particular amounts.

In a preferred embodiment of the invention, the HMO mix may be present in an amount of 0.15-15 g/L of the composition, such as 0.5-10 g/L or 0.75-7.5 g/L or 1-5 g/L or 1 to 2 g/L of the composition. In a particular embodiment, the HMO mix is in an amount of 1.5 g/L of the composition. Such amounts are particularly adequate when the nutritional composition is in the form of a complete nutrition such as an infant formula, or in the case of a growing-up milk.

In case wherein the nutritional composition is in powder form, the HMO mix may preferably be present in an amount of 0.11-11 g/100 g of composition on a dry weight basis, such as 0.4-7.5 g/100 g or 0.6-6 g/L or 0.8-3.8 g/100 g or 0.8-1.5 g/100 g of composition on a dry weight basis. In a particular embodiment, the HMO mix is in an amount of 1.1 g/100 g of composition on a dry weight basis. Such amounts are particularly adequate when the nutritional composition is in the form of a complete nutrition such as an infant formula, or in the case of a growing-up milk.

In another particular embodiment, the HMO mix is in an amount of 5-500 g/L, 10 to 400 g/L, 40 to 300 g/L, 60-200 g/L, 80-180 g/L, 100-150 g/L or 110-130 g/L of the composition. In a particular embodiment, the HMO mix is in an amount of 120 g/L. Such amounts are particularly adequate when the nutritional composition is in the form of a supplement or of a fortifier.

When the supplement or fortifier is in powder form the HMO mix is preferably provided in the nutritional composition of the present invention in such an amount of 0.05-5 g, 0.1-4.5 g, 0.15-4 g, 0.2 to 3.5 g, 0.25 to 3, 0.3 to 2.5, 0.35 to 2, 0.4 to 1.5 g, 0.45-1 g, 0.5 to 0.75 g for example 0.6 g per serving.

In one embodiment, the HMO mix is provided in the nutritional composition of the present invention in such an amount that normal consumption of the nutritional composition would provide to the infant or young child, respectively the child, consuming it a total daily dose of 0.1 to 10 g, such as 0.2-9 g, 0.3-8 g, 0.4-7 g, 0.5-6 g, 0.6-5 g, 0, 8-3 g, 0.9-2 g or 1 to 1.5 g per day.

In a particular aspect, 2'-FL and DiFL are present in the HMO mix in a ratio 2'-FL:DiFL of from 5:1 to 14:1, such as 5:1 to 12:1, 5:1 to 10:1, 6:1 to 10:1 or 7:1 to 9:1. In particularly advantageous embodiments, this ratio is 7:1 or around 7:1.

In a particular aspect of the invention, the nutritional composition is an infant formula comprising an HMO mix consisting of 2'-FL and DiFL wherein:

2'-FL is in an amount of 1-2 g/L, preferably 1.3 g/L, of the composition, and/or in an amount of 0.8-1.5 g/100 g, preferably 1 g/100 g of composition on a dry weight basis; and/or DiFL is in an amount of 0.1 to 0.3 g/L, preferably 0.2 g/L, of the composition and/or in an amount of 0.08-0.2 g/100 g, preferably 0.2 g/100 g of composition on a dry weight basis.

In another particular aspect of the invention, the nutritional composition is a supplement or a fortifier and comprises an HMO mix consisting of 2'-FL and DiFL wherein:

2'-FL is in an amount of 100-110 g/L, preferably 105 g/L, of the composition; and/or DiFL is in an amount of 10-20 g/L, preferably 15 g/L, of the composition.

2'-FL and DiFL may be isolated by chromatography or filtration technology from a natural source such as animal milks. Alternatively, it may be produced by biotechnological means using specific fucosyltransferases and/or fucosidases either through the use of enzyme-based fermentation technology (recombinant or natural enzymes) or microbial fermentation technology. In the latter case, microbes may either express their natural enzymes and substrates or may be engineered to produce respective substrates and enzymes. Single microbial cultures and/or mixed cultures may be used. 2'-FL and DiFL formation can be initiated by acceptor substrates starting from any degree of polymerization (DP), from DP=1 onwards. Alternatively, 2'-FL and DiFL may be produced by chemical synthesis from lactose and free fucose. 2'-FL and DiFL are also available commercially, for example from Glycom A/S in Denmark or Jennewein GmBH in Germany.

The nutritional composition according to the present invention may also comprise other types of oligosaccharide (s) (i.e. other than human milk oligosaccharides) and/or at least a fiber(s) and/or at least a precursor(s) thereof. The other oligosaccharide and/or fiber and/or precursor thereof may preferably be selected from the list comprising galacto-oligosaccharides (GOS), fructo-oligosaccharides (FOS), inulin, xylooligosaccharides (XOS), polydextrose and any combination thereof. They may be in an amount between 0 and 10% by weight of composition. In a particular embodiment, the nutritional composition can also contain at least one BMO (bovine milk oligosaccharide).

Suitable commercial products that can be used to prepare the nutritional compositions according to the invention include combinations of FOS with inulin such as the product sold by BENEO under the trademark Orafti, or polydextrose sold by Tate & Lyle under the trademark STA-LITE®.

In one particular embodiment, the human milk oligosaccharide mix consisting of 2'-FL and DiFL is the only source of oligosaccharide in the nutritional composition.

The nutritional composition of the present invention can further comprise at least one probiotic (or probiotic strain), such as a probiotic bacterial strain.

The probiotic microorganisms most commonly used are principally bacteria and yeasts of the following genera: *Lactobacillus* spp., *Streptococcus* spp., *Enterococcus* spp., *Bifidobacterium* spp. and *Saccharomyces* spp.

In some particular embodiments, the probiotic is a probiotic bacterial strain. In some specific embodiments, it is particularly Bifidobacteria and/or Lactobacilli.

Suitable probiotic bacterial strains include *Lactobacillus rhamnosus* ATCC 53103 available from Valio Oy of Finland under the trademark LGG, *Lactobacillus rhamnosus* CGMCC 1.3724, *Lactobacillus paracasei* CNCM I-2116, *Lactobacillus johnsonii* CNCM I-1225, *Streptococcus salivarius* DSM 13084 sold by BLIS Technologies Limited of New Zealand under the designation K12, *Bifidobacterium lactis* CNCM I-3446 sold inter alia by the Christian Hansen company of Denmark under the trademark Bb 12, *Bifidobacterium longum* ATCC BAA-999 sold by Morinaga Milk Industry Co. Ltd. of Japan under the trademark BB536, *Bifidobacterium breve* sold by Danisco under the trademark Bb-03, *Bifidobacterium breve* sold by Morinaga under the trade mark M-16V, *Bifidobacterium infantis* sold by Procter & Gamble Co. under the trademark Bifantis and *Bifidobacterium breve* sold by Institut Rosell (Lallemand) under the trademark R0070.

The nutritional composition according to the invention may contain from $10^3$ to $10^{12}$ cfu of probiotic strain, more preferably between 107 and $10^{12}$ cfu such as between 108 and $10^{10}$ cfu of probiotic strain per g of composition on a dry weight basis.

In one embodiment the probiotics are viable. In another embodiment the probiotics are non-replicating or inactivated. There may be both viable probiotics and inactivated probiotics in some other embodiments. Probiotic components and metabolites can also be added.

The nutritional composition according to the invention can be for example an infant formula, a starter infant formula, a follow-on or follow-up formula, a baby food, an infant cereal composition, a fortifier such as a human milk fortifier, or a supplement. In some particular embodiments, the composition of the invention is an infant formula, a fortifier or a supplement that may be intended for the first 4 or 6 months of age. In a preferred embodiment the nutritional composition of the invention is an infant formula.

In some other embodiments the nutritional composition of the present invention is a fortifier. The fortifier can be a breast milk fortifier (e.g. a human milk fortifier) or a formula fortifier such as an infant formula fortifier or a follow-on/follow-up formula fortifier.

In another embodiment, the composition of the invention may be a supplement. The supplement may be in the form of tablets, capsules, pastilles, a powder, a gel or a liquid for example. The supplement may further contain protective hydrocolloids (such as gums, proteins, modified starches), binders, film forming agents, encapsulating agents/materials, wall/shell materials, matrix compounds, coatings, emulsifiers, surface active agents, solubilizing agents (oils, fats, waxes, lecithins etc.), adsorbents, carriers, fillers, co-compounds, dispersing agents, wetting agents, processing aids (solvents), flowing agents, taste masking agents, weighting agents, jellifying agents and gel forming agents. The supplement may also contain conventional pharmaceutical additives and adjuvants, excipients and diluents, including, but not limited to, water, gelatine of any origin, vegetable gums, lignin-sulfonate, talc, sugars, starch, gum arabic, vegetable oils, polyalkylene glycols, flavouring agents, preservatives, stabilizers, emulsifying agents, buffers, lubricants, colorants, wetting agents, fillers, and the like.

Further, the supplement may contain vitamins, minerals trace elements and other micronutrients in accordance with the recommendations of Government bodies such as the USRDA.

When the nutritional composition is a supplement, it can be provided in the form of unit doses. 2'-FL and DiFL in terms of daily dose to be administered to the infant or young child, such as described above. In a specific embodiment the nutritional composition is a supplement in powder form and provided in a sachet. When the supplement is in powder form, it may comprise a carrier. It is however preferred that the supplement is devoid of a carrier. In another embodiment, the supplement is in the form of a syrup. In such case, 2'-FL and DiFL are preferably dissolved or suspended in water acidified with citrate.

The nutritional composition according to the invention generally contains a protein source. The protein can be in an amount of from 1.6 to 3 g per 100 kcal. In some embodiments, especially when the composition is intended for premature infants, the protein amount can be between 2.4 and 4 g/100 kcal or more than 3.6 g/100 kcal. In some other embodiments the protein amount can be below 2.0 g per 100 kcal, e.g. between 1.8 to 2 g/100 kcal, or in an amount below 1.8 g per 100 kcal.

The type of protein is not believed to be critical to the present invention provided that the minimum requirements for essential amino acid content are met and satisfactory growth is ensured. Thus, protein sources based on whey, casein and mixtures thereof may be used as well as protein sources based on soy. As far as whey proteins are concerned, the protein source may be based on acid whey or sweet whey or mixtures thereof and may include alpha-lactalbumin and beta-lactoglobulin in any desired proportions.

In some advantageous embodiments the protein source is whey predominant (i.e. more than 50% of proteins are coming from whey proteins, such as 60% or 70%).

The proteins may be intact or hydrolysed or a mixture of intact and hydrolysed proteins. By the term "intact" is meant that the main part of the proteins are intact, i.e. the molecular structure is not altered, for example at least 80% of the proteins are not altered, such as at least 85% of the proteins are not altered, preferably at least 90% of the proteins are not altered, even more preferably at least 95% of the proteins are not altered, such as at least 98% of the proteins are not altered. In a particular embodiment, 100% of the proteins are not altered.

The term "hydrolysed" means in the context of the present invention a protein which has been hydrolysed or broken down into its component amino acids. The proteins may be either fully or partially hydrolysed. It may be desirable to supply partially hydrolysed proteins (degree of hydrolysis between 2 and 20%), for example for infants or young children believed to be at risk of developing cow's milk allergy. If hydrolysed proteins are required, the hydrolysis process may be carried out as desired and as is known in the art. For example, whey protein hydrolysates may be prepared by enzymatically hydrolysing the whey fraction in one or more steps. If the whey fraction used as the starting material is substantially lactose free, it is found that the protein suffers much less lysine blockage during the hydrolysis process. This enables the extent of lysine blockage to be reduced from about 15% by weight of total lysine to less than about 10% by weight of lysine; for example about 7% by weight of lysine which greatly improves the nutritional quality of the protein source.

In an embodiment of the invention at least 70% of the proteins are hydrolysed, preferably at least 80% of the proteins are hydrolysed, such as at least 85% of the proteins are hydrolysed, even more preferably at least 90% of the proteins are hydrolysed, such as at least 95% of the proteins are hydrolysed, particularly at least 98% of the proteins are hydrolysed. In a particular embodiment, 100% of the proteins are hydrolysed.

In one particular embodiment the proteins of the nutritional composition are hydrolyzed, fully hydrolyzed or partially hydrolyzed. The degree of hydrolysis (DH) of the protein can be between 8 and 40, or between 20 and 60 or between 20 and 80 or more than 10, 20, 40, 60, 80 or 90.

The protein component can alternatively be replaced by a mixture or synthetic amino acid, for example for preterm or low birth weight infants.

In a particular embodiment the nutritional composition according to the invention is a hypoallergenic composition. In another particular embodiment the composition according to the invention is a hypoallergenic nutritional composition.

The nutritional composition according to the present invention generally contains a carbohydrate source. This is particularly preferable in the case where the nutritional composition of the invention is an infant formula. In this case, any carbohydrate source conventionally found in infant formulae such as lactose, sucrose, saccharose, maltodextrin, starch and mixtures thereof may be used although one of the preferred sources of carbohydrates is lactose.

The nutritional composition according to the present invention generally contains a source of lipids. This is particularly relevant if the nutritional composition of the invention is an infant formula. In this case, the lipid source may be any lipid or fat which is suitable for use in infant formulae. Some suitable fat sources include palm oil, structured triglyceride oil, high oleic sunflower oil and high oleic safflower oil, medium-chain-triglyceride oil. The essential fatty acids linoleic and α-linolenic acid may also be added, as well small amounts of oils containing high quantities of preformed arachidonic acid and docosahexaenoic acid such as fish oils or microbial oils. The fat source may have a ratio of n-6 to n-3 fatty acids of about 5:1 to about 15:1; for example about 8:1 to about 10:1.

The nutritional composition of the invention may also contain all vitamins and minerals understood to be essential in the daily diet and in nutritionally significant amounts. Minimum requirements have been established for certain vitamins and minerals. Examples of minerals, vitamins and other nutrients optionally present in the composition of the invention include vitamin A, vitamin B1, vitamin B2, vitamin B6, vitamin B112, vitamin E, vitamin K, vitamin C, vitamin D, folic acid, inositol, niacin, biotin, pantothenic acid, choline, calcium, phosphorous, iodine, iron, magnesium, copper, zinc, manganese, chlorine, potassium, sodium, selenium, chromium, molybdenum, taurine, and L-carnitine. Minerals are usually added in salt form. The presence and amounts of specific minerals and other vitamins will vary depending on the intended population.

If necessary, the nutritional composition of the invention may contain emulsifiers and stabilisers such as soy, lecithin, citric acid esters of mono- and diglycerides, and the like.

The nutritional composition of the invention may also contain other substances which may have a beneficial effect such as lactoferrin, nucleotides, nucleosides, and the like.

The nutritional composition of the invention may also contain carotenoid(s). In some particular embodiments of the invention, the nutritional composition of the invention does not comprise any carotenoid.

The nutritional composition according to the invention may be prepared in any suitable manner. A composition will now be described by way of example.

For example, a formula such as an infant formula may be prepared by blending together the protein source, the carbohydrate source and the fat source in appropriate proportions. If used, the emulsifiers may be included at this point. The vitamins and minerals may be added at this point but they are usually added later to avoid thermal degradation. Any lipophilic vitamins, emulsifiers and the like may be dissolved into the fat source prior to blending. Water, preferably water which has been subjected to reverse osmosis, may then be mixed in to form a liquid mixture. The temperature of the water is conveniently in the range between about 50° C. and about 80° C. to aid dispersal of the ingredients. Commercially available liquefiers may be used to form the liquid mixture. 2'-FL and DiFL may be added at this stage, especially if the final product is to be in liquid form. If the final product is to be a powder, they may likewise be added at this stage if desired.

The liquid mixture is then homogenised, for example in two stages.

The liquid mixture may then be thermally treated to reduce bacterial loads, by rapidly heating the liquid mixture to a temperature in the range between about 80° C. and about 150° C. for a duration between about 5 seconds and about 5 minutes, for example. This may be carried out by means of steam injection, an autoclave or a heat exchanger, for example a plate heat exchanger.

Then, the liquid mixture may be cooled to between about 60° C. and about 85° C. for example by flash cooling. The liquid mixture may then be again homogenised, for example in two stages between about 10 MPa and about 30 MPa in the first stage and between about 2 MPa and about 10 MPa in the second stage. The homogenised mixture may then be further cooled to add any heat sensitive components, such as vitamins and minerals. The pH and solids content of the homogenised mixture are conveniently adjusted at this point.

If the final product is to be a powder, the homogenised mixture is transferred to a suitable drying apparatus such as a spray dryer or freeze dryer and converted to powder. The powder should have a moisture content of less than about 5% by weight. 2'-FL and DiFL may also or alternatively be added at this stage by dry-mixing or by blending them in a syrup form of crystals, along with the probiotic strain(s) (if used), and the mixture is spray-dried or freeze-dried.

If a liquid composition is preferred, the homogenised mixture may be sterilised then aseptically filled into suitable containers or may be first filled into the containers and then retorted.

The nutritional composition according to the invention is for use in infants or young children. The infants or young children may be born term or preterm. In a particular embodiment the nutritional composition of the invention is for use in infants or young children that were born preterm, having a low birth weight and/or born small for gestational age (SGA). In a particular embodiment the nutritional composition of the invention is for use in preterm infants, infants having a low birth weight and/or infants born small for gestational age (SGA).

The nutritional composition of the present invention may also be used in an infant or a young child that was born by C-section or that was vaginally delivered.

In some embodiments the composition according to the invention can be for use before and/or during the weaning period.

The nutritional composition can be administered (or given or fed) at an age and for a period that depends on the needs.

The nutritional composition can be for example given immediately after birth of the infants. The composition of the invention can also be given during the first week of life of the infant, or during the first 2 weeks of life, or during the first 3 weeks of life, or during the first month of life, or during the first 2 months of life, or during the first 3 months of life, or during the first 4 months of life, or during the first 6 months of life, or during the first 8 months of life, or during the first 10 months of life, or during the first year of life, or during the first two years of life or even more. In some particularly advantageous embodiments of the invention, the nutritional composition is given (or administered) to an infant within the first 4, 6 or 12 months of birth of said infant. In some other embodiments, the nutritional composition of the invention is given few days (e.g. 1, 2, 3, 5, 10, 15,20 . . . ), or few weeks (e.g. 1, 2, 3, 4, 5, 6, 7, 8, 9, 10 . . . ), or few months (e.g. 1, 2, 3, 4, 5, 6, 7, 8, 9, 10 . . . ) after birth. This may be especially the case when the infant is premature, but not necessarily.

In one embodiment the composition of the invention is given to the infant or young child as a supplementary composition to the mother's milk. In some embodiments the infant or young child receives the mother's milk during at least the first 2 weeks, first 1, 2, 4, or 6 months. In one embodiment the nutritional composition of the invention is given to the infant or young child after such period of mother's nutrition, or is given together with such period of mother's milk nutrition. In another embodiment the composition is given to the infant or young child as the sole or primary nutritional composition during at least one period of time, e.g. after the $1^{st}$, $2^{nd}$ or $4^{th}$ month of life, during at least 1, 2, 4 or 6 months.

EXAMPLES

The following examples illustrate some specific embodiments of the composition for use according to the present invention. The examples are given solely for the purpose of illustration and are not to be construed as limitations of the present invention.

Example 1

An example of the composition of an infant formula according to the present invention is given in the below table 1. This composition is given by way of illustration only.

TABLE 1

Composition of the infant formula of Example 1

| Nutrients | | per 100 kcal | per litre |
|---|---|---|---|
| Energy (kcal) | | 100 | 670 |
| Protein (g) | | 1.83 | 12.3 |
| Fat (g) | | 5.3 | 35.7 |
| Linoleic acid (g) | | 0.79 | 5.3 |
| α-Linolenic acid (mg) | | 101 | 675 |
| Lactose (g) | | 11.2 | 74.7 |
| Minerals (g) | | 0.37 | 2.5 |
| Na (mg) | | 23 | 150 |
| K (mg) | | 89 | 590 |
| Cl (mg) | | 64 | 430 |
| Ca (mg) | | 62 | 410 |
| P (mg) | | 31 | 210 |
| Mg (mg) | | 7 | 50 |
| Mn (μg) | | 8 | 50 |
| Se (μg) | | 2 | 13 |
| Vitamin A (μg RE) | | 105 | 700 |
| Vitamin D (μg) | | 1.5 | 10 |
| Vitamin E (mg TE) | | 0.8 | 5.4 |
| Vitamin K1 (μg) | | 8 | 54 |
| Vitamin C (mg) | | 10 | 67 |
| Vitamin B1 (mg) | | 0.07 | 0.47 |
| Vitamin B2 (mg) | | 0.15 | 1.0 |
| Niacin (mg) | | 1 | 6.7 |
| Vitamin B6 (mg) | | 0.075 | 0.50 |
| Folic acid (μg) | | 9 | 60 |
| Pantothenic acid (mg) | | 0.45 | 3 |
| Vitamin B12 (μg) | | 0.3 | 2 |
| Biotin (μg) | | 2.2 | 15 |
| Choline (mg) | | 10 | 67 |
| Fe (mg) | | 1.2 | 8 |
| I (μg) | | 15 | 100 |
| Cu (mg) | | 0.06 | 0.4 |
| Zn (mg) | | 0.75 | 5 |
| Oligosaccharides | 2'-FL (g) | 0.2 | 1.3 |
| (HMOs) | DiFL (g) | 0.003 | 0.2 |

Example 2

The effectiveness of a combination of 2'-FL and DiFL in reducing nociception was assessed in vivo in an animal trial and compared to other mixes of human milk oligosaccharides.

Water Avoidance Stress (WAS) and Nutritional Interventions

C57BI.6/J mice were purchased from Janvier S A (Le Genest St. Isle, France). Upon their arrival, they were kept in polypropylene cages in a temperature-controlled room with a 12-hour dark-light cycle during 1 week before electrodes implantation (see below). Five days after surgery, mice were submitted to daily WAS by placing them individually 1 h during 9 days on a 3×3 cm platform in a 40×40 cm size pool filled with cold tap water up to 1 cm from the top of the platform. Sham WAS consisted of placing the animals for 1 h/day on the platform in a waterless pool. Animals have free access to water and food. Specific diets were started 3 days before WAS procedure and continued until the end of experiment. Six groups of 12 mice were randomly assigned to the following nutritional interventions:

Group 1: Control diet (AIN93), sham WAS (non sensitized)
Group 2: Control diet (was:AIN93), WAS (sensitized)
Group 3: Experimental diet (WAS:2'FL+DiFL), AIN93 supplemented with 2'-FL 0.55% w/w and DiFL 0.06% w/w), WAS (sensitized)
Group 4: Experimental diet (WAS:2'FL+DiFL+LNT), AIN93 supplemented with 2'-FL 0.55% w/w, DiFL 0.06% w/w) and LNT 0.18% w/w, WAS (sensitized)

Group 5: Experimental diet (WAS:3'SL+6'SL), AIN93 supplemented with 3'-SL 0.07% w/w and 6'-SL 0.09% w/w), WAS (sensitized)

Group 6: Experimental diet (WAS:6HMO), AIN93 supplemented with 2'-FL 0.55% w/w, DiFL 0.06% w/w), 3'-SL 0.07% w/w, 6'-SL 0.09% w/v, LNnt 0.05% w/w and LNT 0.18% w/w, WAS (sensitized)

Colorectal Distension (CRD)

To measure abdominal muscle contractions as an index of pain, mice were equipped with 2 nickel-chrome wire electrodes implanted into the abdominal external oblique muscle and one under the skin of the abdomen. Surgery was performed under xylazine/ketamine anesthesia (both 1.2 mg, subcutaneously). A small ballon (Fogarty, Edwards Laboratories Inc., Santa Anna, USA) was introduced in the rectum and fixed at the base of the tail. The balloon was progressively inflated from 0 to 0.10 ml, by steps of 0.02 ml. Each step of distension lasted 10 sec alternated with a 5 min recovery period in between without distension.

Visceral sensitivity to CRD was assessed by abdominal muscle electromyography

Results

The results are provided in FIGS. 1 to 4. The amplitude of contraction, which is associated with pain perceived by the mice, was significantly increased by the fact that WAS mice were sensitized (was:AIN93, Group 2), compared to non-sensitized mice (AIN93, Group 1). As shown in FIG. 1, administration of a blend of 2'-FL and DiFL was able to reduce the amplitude of contraction and thus the perceived pain of sensitized mice (was:2'FL+DiFL, Group 3). For a CRD of 0.06 mL and above, the amplitude of contraction can even not be statistically distinguished from what is observed in non-sensitized mice. This is a very relevant achievement because a CRD of 0.06 mL corresponds to the typical threshold of pain, whereas smaller dilatation volumes are rather associated with discomfort.

Figure 2:
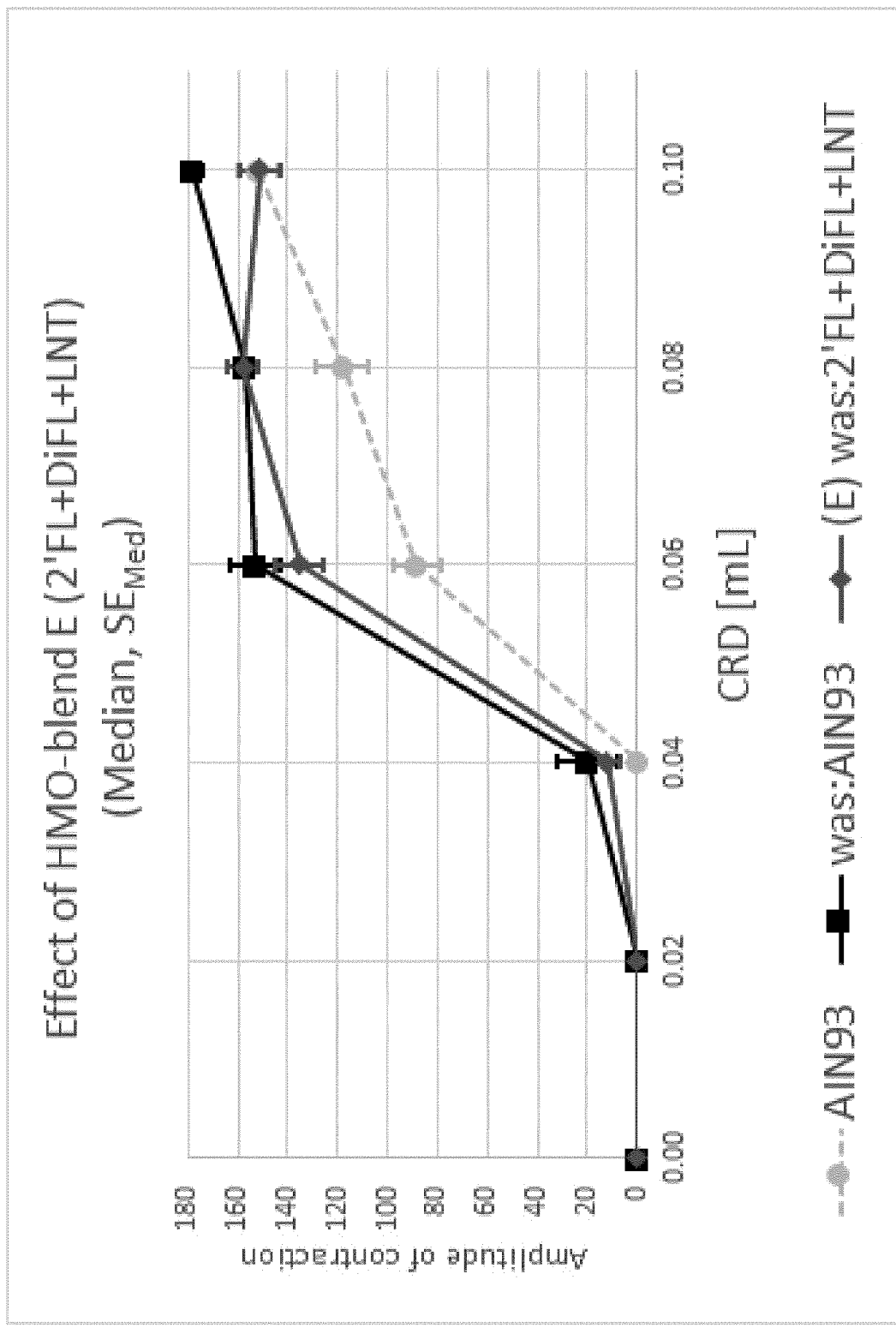
FIG. 2: amplitude of contraction measured as a function of colorectal dilatation in non-sensitized mice (AIN93; dots), in sensitized mice (was:AIN93; squares) and in sensitized mice to which 2'-FL, DiFL and LNT have been administered (was:2'FL+DiFL; diamonds).

In contrast, the amplitude of contraction was reduced to a lesser extent for the other tested HMO mixes. In particular, addition of further human milk oligosaccharides in addition to 2'-FL and DiFL limited the reduction of the amplitude of contraction. Addition of LNT to 2'-FL and DiFL (was:2'FL+ DiFL+LNT, Group 4), for example, leads to an amplitude of contraction which cannot be statistically distinguished from the sensitized mice that did not get any HMO supplementation (FIG. 2). Thus the positive effect of 2'-FL and DiFL on reduction of pain perception is lost when LNT is added, as can be seen from the comparison of FIGS. 1 and 2.

Figure 4:
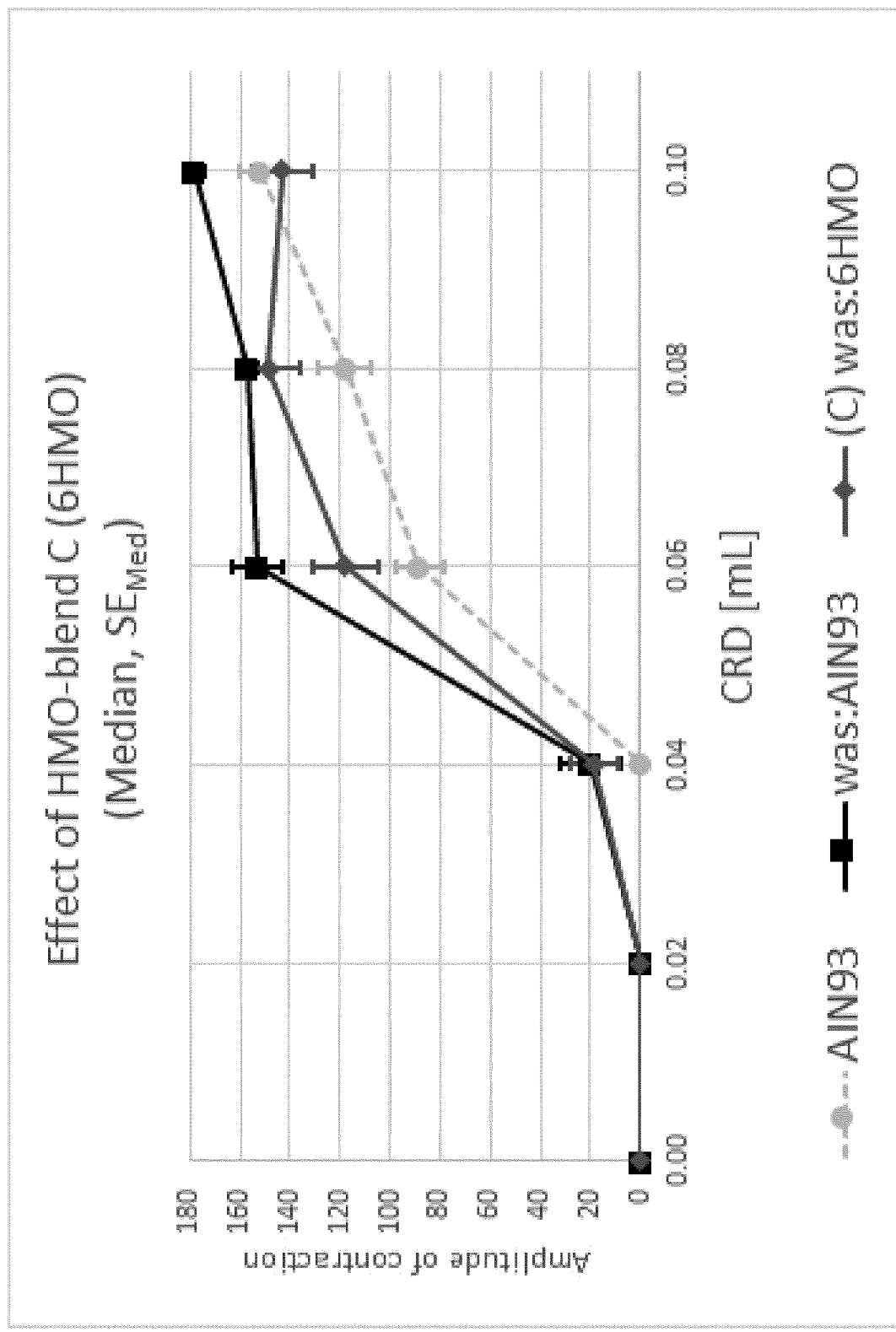
FIG. 4: amplitude of contraction measured as a function of colorectal dilatation in non-sensitized mice (AIN93; dots), in sensitized mice (was:AIN93; squares) and in sensitized mice to which 2'-FL, DiFL, LNT, LNnT, 3'-SL and 6'-SL have been administered (was:HMO6; diamonds).

The mix of the six HMOs 2'-FL, DiFL, 3'-SL, 6'-SL, LNT and LNnT (was:6HMO, Group 5) was also less efficient than the mix consisting of 2'-FL and DiFL in reducing the amplitude of contraction and thus the perception of pain in the tested subjects, in particular for a CRD of 0.06 or above (FIG. 4).

Figure 3:
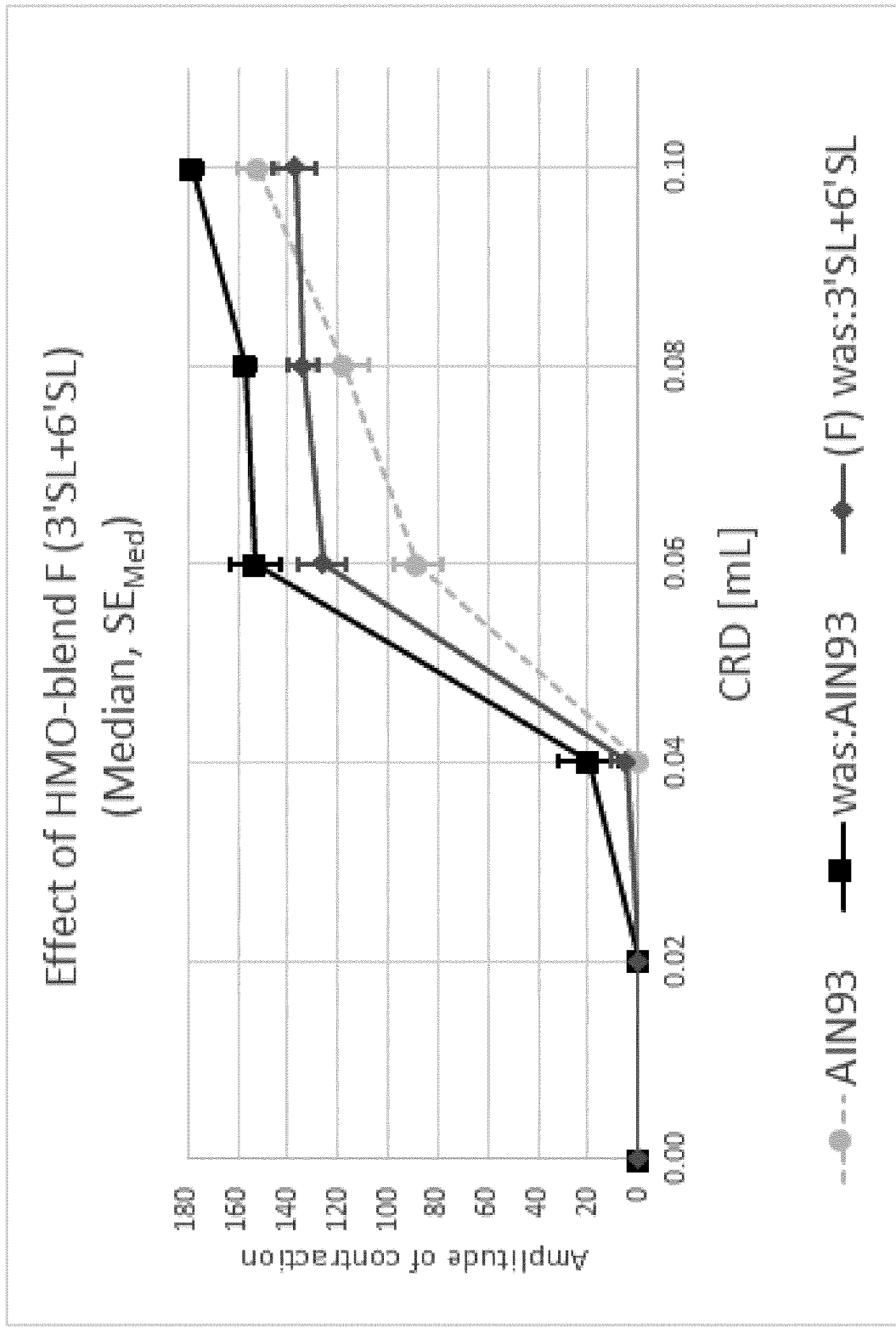
FIG. 3: amplitude of contraction measured as a function of colorectal dilatation in non-sensitized mice (AIN93; dots), in sensitized mice (was:AIN93; squares) and in sensitized mice to which 3'-SL and 6'-SL have been administered (was:3'SL+6'SL; diamonds).

Administration of the sialylated oligosaccharides 3'-SL and 6'-SL (was:3'SL+6'SL), Group 6) also provided a much smaller reduction of the amplitude of contraction and thus of the perception of pain compared to the mix consisting of 2'-FL and DiFL (FIG. 3).

Example 3

A supplement for colicky infant is provided in the form of 5 mL syrup in a stick pack and consists of 105 g/L of 2'FL and 15 g/L of DiFL, dissolved in water. The dosage regiment is of two stick packs per day.

The invention claimed is:

1. A method for reducing pain and/or perception of pain in an infant under the age of 12 months or a young child aged between one and three years of age, the method comprising administering a nutritional composition comprising a mix of human milk oligosaccharides (HMOs) consisting of 2'-fucosyllactose (2'-FL) and difucosyllactose (DiFL) to the infant or young child, wherein the nutritional composition comprises the mix of HMOs in an amount effective to deliver a total daily dose of about 0.1 g to about 10 g of HMOs to the infant or young child upon normal daily consumption of the nutritional composition.

2. The method according to claim 1, wherein the method reduces abdominal pain and/or visceral sensitivity in the infant or the young child.

3. The method according to claim 1, wherein the method restores the sensitivity of the bi-directional pain transmission pathways in the gut-brain axis to normal levels.

4. The method according to claim 1, wherein the method reduces pain associated with gastrointestinal discomfort, a functional gastrointestinal disorder, an gastrointestinal diseases, or combinations thereof.

5. The method according to claim 1, wherein the infant or the young child experiences pain.

6. The method according to claim 5, wherein the infant or the young child experiences abdominal pain.

7. The method according to claim 6, wherein the infant or the young child experiences pain associated with gastrointestinal discomfort, functional gastrointestinal disorders, and/or gastrointestinal diseases.

8. The method according to claim 7, wherein the gastrointestinal discomfort is selected from the group consisting of colic, bloating, cramps, and combinations thereof; the functional gastrointestinal disorder is selected from the group consisting of functional dyspepsia, functional constipation, functional diarrhea, irritable bowel syndrome (IBS), abdominal migraine, recurrent abdominal pain (RAP), functional abdominal pain-not otherwise specified (FAP-NOS), and combinations thereof; and the gastrointestinal disease is selected from the group consisting of inflammatory bowel disease (IBD), infectious diarrhea, necrotizing enterocolitis (NEC), and combinations thereof.

9. The method according to claim 1, wherein the 2'-FL and the DiFL are present in a weight ratio of 2'-FL:DiFL of from 5:1 to 14:1.

10. The method according to claim 1, wherein the human milk oligosaccharides mix is present in an amount of 0.15-15 g/L of the nutritional composition.

11. The method according to claim 1, wherein the human milk oligosaccharides mix is present in an amount of 0.11-11 g/100 g of the nutritional composition on a dry weight basis.

12. The method according to claim 1, wherein the nutritional composition further comprises at least one probiotic in an amount ranges from $10^3$ to $10^{12}$ cfu/g of the nutritional composition (dry weight).

13. The method according to claim 1, wherein the nutritional composition is in a form selected from the group consisting of an infant formula, a starter infant formula, a follow-on or follow-up infant formula, a baby food, an infant cereal composition, a fortifier and a supplement.

14. The method according to claim 1, wherein the nutritional composition is an infant formula comprising the HMO mix consisting of 2'-FL and DiFL, wherein:
the 2'-FL is in an amount of 1-2 g/L of the nutritional composition, and
the DiFL is in an amount of 0.1 to 0.3 g/L of the nutritional composition.

15. The method according to claim 1, wherein the nutritional composition is a supplement or a fortifier and comprises the HMO mix consisting of 2'-FL and DiFL, wherein:
   the 2'-FL is in an amount of 100-110 g/L of the composition; and
   the DiFL is in an amount of 10-20 g/L of the composition.

16. The method according to claim 1, wherein the nutritional composition is for use in preterm infants, infants having a low birth weight, and/or infants born small for gestational age (SGA).

17. A method for reducing nociception in a child between three and seven years of age, the method comprising administering a growing-up milk comprising a mix of human milk oligosaccharides consisting of 2'-FL and DiFL to the child.

18. The method according to claim 1, wherein the 2'-FL is in an amount of 105 g/L of the nutritional composition.

19. The method according to claim 1, wherein the DiFL is in an amount of 15 g/L of the nutritional composition.

* * * * *